Sept. 16, 1958   D. H. DE MOTT ET AL   2,851,997
MULTI-STAGE HYDRAULIC AMPLIFIER VALVE
Filed Oct. 9, 1956
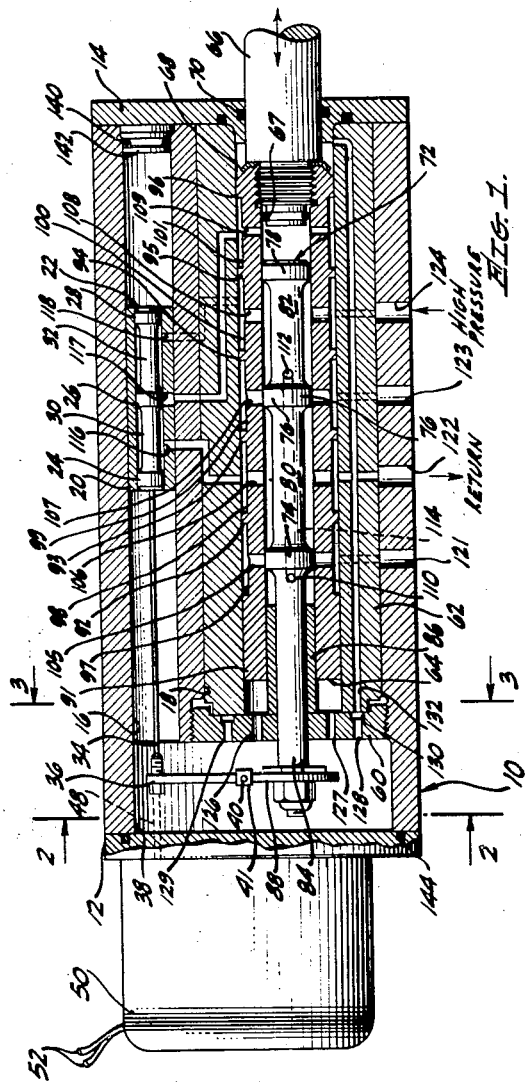
INVENTORS.
DALE H. DE MOTT,
ROBERT L. LIEBERMAN,
BY
Perry E. Turner
AGENT.

United States Patent Office 2,851,997
Patented Sept. 16, 1958

2,851,997

MULTI-STAGE HYDRAULIC AMPLIFIER VALVE

Dale H. De Mott and Robert L. Lieberman, Los Angeles, Calif., assignors to Lear, Incorporated, Santa Monica, Calif.

Application October 9, 1956, Serial No. 614,901

8 Claims. (Cl. 121—46.5)

This invention relates to hydraulic valves, and more particularly to a compact valve arrangement capable of converting either or both electrical and mechanical inputs of substantially different orders of magnitude into an amplified hydraulic output.

In many hydraulic valve applications, and particularly in aircraft, it is desirable to control a device automatically in response to electrical signals and to manually instituted mechanical signals, e. g., operation of a rudder in response to low level electrical signals derived from a gyroscope and high level mechanical forces established directly by manipulation of the pilot's "control stick." Many prior art valves utilize an input shaft upon which only one mechanical signal can be accepted. If both the electrical signal and manually instituted mechanical signal are to be utilized to control the valve, the electrical signal must first be transformed into a mechanical signal of approximately the same force level as the manually instituted signal. The electrically and manually instituted mechanical signals must then be summed at a point outside the valve, and the resultant mechanical signal then applied to its input shaft. Arrangements for utilizing such mechanical forces of significantly different orders of magnitude generally employ separate valves and hydraulic feed systems of complex design and undue volume and weight, often taxing space and weight limitations, and which present undesired maintenance problems.

It is an object of this invention to provide a single hydraulic valve which is capable of receiving both low force level electrical and high force level mechanical inputs, singly or in combination, to provide an amplified hydraulic output which is the algebraic sum of both.

It is another object of this invention to provide a single hydraulic amplifier valve capable of replacing separate electrically and mechanically operated hydraulic valves, which occupies a minimum of space and is lighter in weight than the separate valves heretofore employed.

It is still a further object of this invention to provide an improved hydraulic valve arrangement wherein a single compact valve performs the functions of separate electrically operated and mechanically operated hydraulic valves heretofore employed, which employs a minimum number of component parts of simple design and rugged construction, and which is capable of reliable operation over a long operating life.

The above and other objects and advantages of this invention will be apparent from the following description, taken in conjunction with the accompanying drawings, in which a preferred embodiment of the invention is illustrated by way of example. The scope of the invention is pointed out in the appended claims. In the drawings, Fig. 1 is a sectional view of a valve structure in accordance with this invention, Fig. 2 is a cross section taken along line 2—2 of Fig. 1, and Fig. 3 is a view in elevation taken along line 3—3 of Fig. 1.

Briefly, the valve of this invention comprises a pilot valve located in one chamber of a housing, and slave and sleeve valves located in a second chamber. The pilot valve is operated in response to low-level force inputs, and the sleeve valve is adapted to receive high-level force inputs. Connecting ports between the pilot and slave valves are provided to effect movement of the slave valve in response to the pilot valve and to establish an amplified hydraulic output for an output device. The sleeve valve is moved in response to the mechanical input forces to expose the output device to oil flow in an amount corresponding to the position thereof. Where both low-level and high-level force inputs are present, the output device is operated in accordance with the algebraic sum thereof.

Referring to Figs. 1 and 2, the valve of this invention is enclosed in a housing or body 10 provided at its opposite ends with end caps 12, 14. Body 10 is provided with a pair of cylindrical chambers 16, 18. Fixed within chamber 16 is a sleeve 20, within which a pilot valve 22 is slidably positioned. Pilot valve 22 has three spaced lands 24, 26 and 28 separated by shank sections, 30, 32 of reduced diameter. A rod 34 connects one end of valve 22 to an actuating member 36 located in a recess 38 with which both chambers 16, 18 are in communication; end cap 12 forms the closure for recess 38. Actuating member 36 is a rod mounted for pivotal movement with a shaft 40 (see Fig. 2) which extends laterally through the housing and recess 38, and for this purpose rod 36 is fixed to a hub member 41 which is secured to the shaft 40. Shaft 40 extends through a second recess 42, where a hub element 44 is fixed to the shaft. A rod 46 is fixed to hub 44, and rod 46 is fixed at its opposite end to a shaft 48 which is adapted for longitudinal or axial movement to force shaft 40 in a direction in response to forces corresponding to electrical signals; for this purpose, shaft 48 may constitute the force output member of a torque motor 50 to which input signals are applied, as through leads 52.

A disc 60 is threadedly secured in the end of chamber 18 and adjacent recess 38. Fixed within chamber 18, and extending between disc 60 and end cap 14, is a sleeve 62. Positioned for sliding movement within the sleeve 62 is a sleeve valve 64,, which at the end thereof adjacent the end cap 14, is threadedly secured to the end of a rod 66 extending through end cap 14 from the exterior of the body 10. The inner end of rod 66 is reduced in diameter and projects into the bore of sleeve valve 64, where it is necked down to receive an O-ring seal 67 which prevents escape of fluid through that end of sleeve valve 64. A lock washer 68 is placed around the rod 66 adjacent the rear of the threads and against the end of sleeve valve 64. An O-ring seal 70 is fitted in end cap 14 and surrounds rod 66 to prevent fluid from escaping through the housing past the rod.

Slidably mounted within sleeve valve 64, for longitudinal movement relative thereto, is a slave valve 72. Slave valve 72 has three spaced lands 74, 76, and 78 separated by shank sections 80 and 82 of reduced diameter. A similar shank section 84 extends from land 74 through disc 60 into recess 38. A short sleeve bushing 86 surrounds shank extension 84 and fills the space between shank extension 84 and sleeve valve 64 to keep such shank extension centrally positioned within sleeve valve 64. Within recess 38 the inner end of a telescopic type spring 88 is fixed to the end of shank extension 84. The outer end of spring 88 is fixed to hub 41. As explained in the aforementioned co-pending application, spring 88 is preferably of spring metal, formed in the past of a flat coil, lying in a plane perpendicular to the axis of slave valve 72, as shown in Figs. 1 and 2. The inner end of the spring is fixed to shank extension 84. With the outer end of the spring fixed to hub 41, it will be apparent that movement of the slave valve will cause the center of the spring to move axially therewith. The turns of the spring will also be moved axially thereof; each will move through a shorter distance than turns nearer the center. Therefore, the spring will tend to telescope axially upon movement of slave valve 72.

To effect operation of the valve arrangement in a desired manner, sleeve valve 64 has six spaced lands 91, 92, 93, 94, 95, 96, adjacent pairs of which are separated by respective shank sections 97, 98, 99, 100, 101 of reduced diameter. Holes or port openings 105, 106, 107, 108, 109 extend through respective shank sections 97, 98, 99, 100, 101. Openings 105 and 107 are equal in width to lands 74 and 76 of slave valve 72, and such openings and lands are coextensive in neutral positions of the slave valve 72 and sleeve valve 64. Further, respective openings 110 and 112 are provided in shank extensions 82 and 84 of slave valve 72, and are connected by a conduit, indicated at 114, extending through the body of the slave valve.

Thus arranged, the valves each have spaced lands defining fluid chambers, the cooperative relations of which will be made more apparent hereinafter.

Sleeve 20 in chamber 16 is provided with three spaced port openings 116, 117, 118. With pilot valve 22 centrally positioned within sleeve 20 as shown in Fig. 1, the center opening 117 is coextensive with the middle land 26, and the outer openings 116, 118 are located between the ends of respective shank sections 30, 32. By means of flow connection channels provided in body 10 and sleeve 62, openings 116 and 118 are in communication with the spaces surrounding the respective shank sections 98 and 100 of sleeve valve 64, and hence with the spaces surrounding shank sections 80, 82 of the slave valve 72. Similarly, opening 117 is in communication with opening 109 in shank section 101 of the slave valve.

Four ports 121, 122, 123, and 124 are provided in body 10 as indicated. Flow connections are provided in sleeve 62 whereby ports 121 and 123 are in communication with shank sections 97 and 99 of sleeve valve 64, and hence in communication with openings 105 and 107 leading to the lands 74 and 76 of slave valve 72. In a similar manner, ports 122 and 124 are in communication with shank sections 98 and 100 of the sleeve valve, and hence in communication through openings 106 and 108 with respective shank sections 80 and 82 of the slave valve.

To complete the paths for oil flow, flow connections are provided whereby chamber 38 is in communication with sleeve valve 64 at its opposite ends. For this purpose, disc 60 is provided with a pair of openings 126, 127 aligned with the space between sleeve bushing 86 and sleeve 62. In addition, disc 60 is provided with a pair of openings 128, 129 extending from recess 38 to a circular groove 130 in the inner surface thereof (see Fig. 3). A flow connection 132 extends longitudinally through sleeve 62 between groove 130 and the space between rod 66 and sleeve 62 adjacent end cap 14. Flow connection 132 also is in communication with return port 122, as shown; thus, the ends of sleeve valve 64 are kept under low pressure.

Seals are provided to prevent escape of fluid from chamber 16 through end cap 14 and from recess 38 through end cap 12 and into recess 42. An O-ring 140 is located between the wall of chamber 16 and an insert 142 which is held at one end against body 10 by end cap 14. Another O-ring 144 is located about the inner peripheral surface of end cap 12 to prevent leaks through recess 38. Still another seal (not shown) is placed around shaft 40 within body 10 intermediate recesses 38 and 42.

The construction of pilot valve 10, slave valve 72, spring 88, actuating member 36 and rod 46 are all as described in copending application of Dale H. DeMott et al., entitled "Hydraulic Amplifier Valve," Serial No. 493,272, filed March 9, 1955, and assigned to the same assignee as this application. Further, the arrangement of flow connections through sleeve valve 64 is such that the operation of pilot valve 22 and slave valve 72 is identical to that described in such copending application. Also, the compressed seal arrangement there described is preferably used here intermediate recesses 38 and 42 for permitting input forces applied to shaft 48 to be transmitted through shaft 40 to the pilot valve without friction losses.

To effect operation of the valves, oil at high pressure is fed through port 124 from an external source (not shown), and port 122 is a low pressure or return port for oil at low pressure. Thus, and assuming the valves initially to be positioned as shown in Fig. 1, high pressure oil surrounds shank sections 32, 82 and 84 of the respective pilot and slave valves, and shank sections 30, 80 of the respective valves are exposed to the low pressure oil. If the sleeve valve is maintained in the position shown in Fig. 1, any movement of the pilot valve from its balanced position will effect oil flow between the pilot valve and the end of land 78 (right-hand face in Fig. 1) of the slave valve. Assume an input force to be transmitted through shaft 48 to cause rod 46 to move outwardly and effect a counter-clockwise rotation of shaft 40, thereby to cause pilot valve 22 to be moved to the left in Fig. 1. This exposes port opening 117 to the high pressure oil surrounding shank section 32, whereupon the high pressure oil is conducted through opening 109 to be applied against the end of land 78 of the slave valve.

It is noted that high pressure oil also surrounds shank extension 84 between sleeve bushing 86 and land 74. The diameter of shank extension 84 is such that the area of land 74 against which the high pressure oil is applied is substantially half the area of the surface of land 78 at the opposite end of the slave valve. Thus, with high pressure oil applied against both ends of the slave valve, there exists a net force of one-half the product of the supply pressure and the area of the end of land 78 to move the slave valve to the left. This net force results in an acceleration of the slave valve to a velocity proportional to the flow of high pressure oil to the end of land 78. This movement of slave valve 72 is in the same direction as pilot valve 22, and results in clockwise rotation of shaft 40 through spring 88 to restore the pilot valve 22 to its original position.

With the slave valve initially positioned so that lands 74 and 76 are coextensive with openings 105 and 107, its stroke action to the left will cause opening 105 to receive low pressure or return oil surrounding shank section 80, and opening 107 will receive the high pressure or supply oil surrounding shank section 82. Thus, a flow of oil results between ports 121 and 123, and a hydraulically actuated member (not shown) connected to these ports will accelerate up to a speed corresponding to the stroke of the slave valve.

When the pilot valve is returned to its initial position, a pressure exists at the end of land 78 of the slave valve which is equal to one-half the supply pressure. How this is accomplished may be realized by considering that the lands of the pilot valve and its sleeve form metal-to-metal seals, and that oil flows around land 26 and past opening 117. Such flow establishes at opening 117 a pressure of substantially one-half the supply pressure which is transmitted through the flow connection from opening 117 to the end of land 78 of the slave valve. Because of the difference between the areas of the end lands of the slave valve, the result is a force tending to move the slave valve to the left, which is equal to that tending to move it to the right, and the slave valve is thus held stationary. It will be realized that the pilot valve will seek a position where the pressure in the vicinity of opening 117 is half the supply pressure, and in this arrangement this position is where its middle land 26 is coextensive with opening 117. If a succeeding force applied along input shaft 48 again effects counter-clockwise rotation of shaft 40 the operation above described will again take place and slave valve 72 will be moved to a position further to the left. This will result in a greater portion of openings 105 and 107 being exposed between the ends of shank sections 80 and 82, with the result that a greater velocity of oil flow occurs to operate the output device at a greater speed in the same direction.

The reverse of the above described operations takes place when forces transmitted along input shaft 48 cause shaft 40 to be rotated clockwise and pilot valve 22 to be moved to the right of Fig. 1. For each movement of the pilot valve to the right, the end of land 78 is exposed to the low-pressure surrounding shank extension 30; since the high-pressure oil is applied against the left end land 74 the slave valve will be moved to the right. If the slave valve is first moved to the left as previously described, successive movements thereof to the right will result in less and less oil flow from outlet port 123 to outlet port 121, thus decelerating the output device, until movement of the slave valve to the right of the position shown in Fig. 1. For such positions of the slave valve to the right, reverse oil flow from the outlet takes place, i. e., outlet port 121 is exposed to high pressure oil surrounding shank extension 84, and outlet port 123 is exposed to low pressure oil surrounding shank section 80; the output device would thus be accelerated to successively greater speeds in the opposite direction.

If no electrical signals are applied to cause pilot valve 22 to be actuated, and the sleeve valve 64 and slave valve 72 are in their balanced positions shown in Fig. 1, longitudinal movement of sleeve valve 64, by externally actuating rod 66, either manually or automatically, will cause oil flow in direction and amount depending upon the stroke thereof. If the sleeve valve 64 is moved to the left of its position in Fig. 1, high pressure oil surrounding shank extension 84 flows through outlet port 121, and outlet port 123 is exposed to the low pressure oil surrounding shank section 80. The reverse flow takes place for positions of sleeve valve 64 to the right of the position shown in Fig. 1; in this case, high pressure oil surrounding shank section 82 flows through outlet port 123, while outlet port 121 is exposed to low pressure oil surrounding shank section 80.

It is noted that the flow of oil through the outlet ports in response to sleeve valve movement is opposite to the flow which occurs upon movement of the slave valve 72. When both slave valve and sleeve valve are moved, the total oil flow through the outlet ports will correspond to the algebraic sum of the motions of these valves. If the valves are moved in opposite directions, the direction of oil flow through the outlet ports is in the direction it would be if only one of the valves were moved; however, the magnitude of such oil flow corresponds to the combined strokes of the sleeve and slave valves.

If the slave and sleeve valves are moved in the same direction, the direction of outlet oil flow is determined by the positions of the valves relative to their positions as shown in Fig. 1. If they are moved the same distance, obviously no net change in outlet oil flow occurs. If the distances differ, the oil flow will be in a direction depending upon whether the openings 105, 107 of the sleeve valve are to the right or left of the respective lands 74, 76 of the slave valve; the magnitude of the flow will depend upon the displacement of such openings relative to such lands.

It will be apparent that the value structure of this invention provides a manual control valve member for use in conjunction with a closed-loop, two-stage hydraulic amplifier valve. An output device can thus be allowed to operate automatically under electrical input control signals, yet be subject to manual control at all times; thus, the manual control feature may be used as an override provision, as will be apparent upon considering the foregoing explanation of the combined effects of electrical and manual operation of the valves. Such manual control features are important in many applications. Typical examples of such applications are found in controlling the position of hydraulically actuated elevators or cargo hoists, and controlling in an aircraft the position of a hydraulically actuated control surface; actuators for such devices may be output devices automatically controlled by oil flow through outlet ports 121, 123, in response to electric signals applied to torque motor 50, and control of sleeve valve 64 through manual operation of rod 66 insures that the automatic operations can be overridden to maintain or change the position of the output devices as circumstances may require.

The valve structure of this invention is comparable in size and weight to two-stage valves heretofore employed. In this connection, it should be noted that sleeve valve 64 need contribute nothing to volume, inasmuch as it is concentric with slave valve 72, the bore of sleeve 62 simply being made large enough to acccommodate both; further, its weight may be considered negligible when compared to the rest of the structure.

It will be apparent from the foregoing that there has been described an improved valve structure which represents a considerable simplification and advance over the prior art, wherein respective valve members operable in response to manually applied high-level forces and automatically applied low-level forces are compactly arranged in a single housing, wherein only a single hydraulic feed system is utilized, and wherein complexity and number of components are reduced to a minimum.

What is claimed is:

1. In combination, a housing, first, second and third valves in said housing, said second valve being slidably mounted in said third valve, said housing having a plurality of cooperating passages, said valves being located within said passages, means to direct fluid from an external source through inlet ports, means to actuate said first valve in response to external mechanical forces of one order of magnitude, said first valve upon being actuated directing fluid to said second valve to effect movement of said second valve, said second valve directing fluid through outlet ports to the exterior of said housing, means to actuate said third valve in response to external mechanical forces of a second and relatively large order of magnitude, said third valve upon being actuated also directing fluid through said outlet ports to the exterior of said housing, whereby the direction and magnitude of fluid flow through said third and fourth portions is determined by the combined positions of said second and third valves, and whereby an external hydraulically operable device for receiving the fluid directed through said outlet ports will be operated in response to the combined movements of said second and third valves.

2. A valve mechanism for controlling a fluid actuated device comprising a housing, first, second and third valve members in said housing, said second valve member being slidably supported by said third valve member, said housing and valve members having cooperating passages for receiving fluid from an external fluid feed source and directing fluid to the fluid actuated device, said first valve member having a balanced position, said second valve member upon movement of said first valve member from said balanced position directing fluid to said third valve member, said third valve member moving in response to the fluid applied thereto and transmitting fluid through a portion of said passages to the fluid actuated device, means operable upon movement of said third valve member to restore said first valve member to said balanced position, a control member fixed to said second valve member and extending to the exterior of said housing, said second valve member upon being moved by said control member also transmitting fluid through said portion of said passages to the fluid actuated device, whereby the fluid transmitted to the device is controlled by the combined movements of said second and third valve members.

3. A hydraulic valve mechanism comprising a housing having first and second valve chambers, a pilot valve slidable in said first valve chamber, said pilot valve having a balanced position, a sleeve valve slidable in said second valve chamber, a slave valve slidable in said sleeve valve, said pilot valve having lands defining first and second fluid chambers, first passages in communication with said first valve chamber for connecting said first and second fluid chambers respectively to points of high-pressure fluid and return fluid from a source, second passages connecting said first valve chamber to said second valve chamber, third passages for connecting said second valve chamber to a fluid operated output device, said sleeve valve having openings in communication with said second passages, said slave valve having lands defining respective fluid chambers in communication with said openings, first input means for actuating said pilot valve in response to first mechanical input forces, passage means connected between said first and second valve chambers for exposing a portion of said slave valve to the high-pressure fluid upon movement of the pilot valve in one direction and to return fluid upon movement of the pilot valve in the opposite direction, means mechanically interconnecting said slave valve and said pilot valve and operable upon movement of said slave valve to return said pilot valve to said balanced position following movement of said pilot and slave valves in response to said first mechanical input forces, and second input means for actuating said sleeve valve in response to second mechanical forces, whereby the direction and magnitude of fluid flow through said third passages to the output device is determined by the combined positions of said slave valve and said sleeve valve.

4. A hydraulic valve mechanism comprising a pilot valve and a cylinder therefor, a slave valve, a sleeve valve surrounding and supporting said slave valve for sliding movement therein, a second cylinder guiding said sleeve valve for axial movement, a passage in communication with a source of high pressure fluid, a passage for return of fluid to the source, said passages being in communication with said first cylinder, passages connecting said first cylinder to said second cylinder, said pilot valve having lands defining fluid chambers for control of fluid into and out of said first cylinder, said sleeve valve having lands for control of fluid flow to and from said slave valve, said slave valve having lands defining fluid chambers to receive fluid for moving said slave valve in response to movement of said pilot valve, respective force input means for actuating said pilot valve and said sleeve valve, passages for connecting said second cylinder to an output device, and the two force inputs being applied independently for controlling the direction and magnitude of fluid flow to the output device in accordance with the sum thereof as represented by the combined movements of said slave valve and said sleeve valve.

5. In combination, a housing having first and second input ports for connection to an external fluid feed source, said first port being a high pressure fluid input port and said second port being a low pressure fluid return port, said housing having first and second outlet ports for connection to a hydraulically operated output device, said housing having first and second interior chambers, first, second and third valve members, said first valve member being slidably positioned in said first chamber, said second and third valve members being slidably positioned in said second chamber, means effecting communication of respective first portions of said first and third valves with said first input port, whereby said first portions are exposed to fluid at high pressure, means effecting communication of respective second portions of said first and third valves with said second input port, whereby said second portions are exposed to fluid at low pressure, means for applying low-level force inputs mechanically to said first valve, means to effect fluid flow between said first and third valves upon application of the low-level force inputs to set up a force differential between predetermined opposed portions of said third valve to effect movement of said third valve in a direction and through a distance corresponding to the direction and magnitude of the low-level force inputs, said first and second outlet ports receiving fluid flow in direction and magnitude corresponding to the change in position of said third valve in response to the low-level force inputs, an external member for receiving high-level force inputs, said external member extending into said housing and being fixed to said second valve at one end thereof, said second valve upon being moved by said external member effecting a flow of fluid through said first and second outlet ports in direction and magnitude corresponding to the direction and distance of movement thereof, whereby the direction and magnitude of fluid flow through said first and second outlet ports corresponds to the combined movements of said second and third valves, and whereby high-level force inputs applied to said external member can be utilized to override the effect of said low-level force inputs on fluid flow through said first and second outlet ports in controlling the output device.

6. A hydraulic valve mechanism comprising a housing, first, second and third valve members in said housing, said second valve member being slidable within said third valve member, means to apply fluid to said first valve, said first valve having a balanced position, first means to apply external mechanical input forces automatically to said first valve member to effect movement thereof from said balanced position, means operable upon movement of said first valve member to direct fluid to said second valve member, said second valve member responding to fluid directed thereto to effect transmission of fluid to the exterior of said housing, second means for manually controlling said third valve member from the exterior of said housing, said third valve member upon being moved by said second means also effecting transmission of fluid to the exterior of said housing, whereby a fluid actuated device may be adapted to receive the fluid flow transmitted to the exterior of the housing and operated in response to the combined movements of said second and third valve members.

7. A valve mechanism comprising a body member having a recess in one surface, said body having parallel chambers in communication at one end with said first recess, a pilot valve slidable in said first chamber, means for actuating said pilot valve in response to low force level mechanical inputs, a sleeve slidable in said second chamber, a slave valve slidable in said sleeve valve, a manual control rod for receiving high-level force inputs, said rod being fixed to the end of said sleeve valve remote from said first recess, said rod extending to the exterior of said housing, said housing having first and second ports to be connected to an external source of fluid, said first port being a high pressure fluid input port and said second port being a low pressure fluid return port, first flow connections connecting respective first portions of said pilot valve and slave valve to said first port, second flow connections connecting respective second portions of said pilot valve and slave valve to said second port, third flow connections connecting said input port to the end of said slave valve adjacent said first recess, fourth flow connections conductively connecting the other end of said slave valve to one of said first and second portions of said pilot valve upon movement of said pilot valve in response to said low-level force inputs, a fluid pressure difference being established at the ends of said slave valve upon said other end thereof being exposed to fluid through said fourth flow connections, said slave valve moving in a direction and through a distance corresponding to the direction and magnitude to force inputs applied to said pilot valve, means interconnecting said pilot valve and slave valve in said recess whereby said slave valve moves said pilot valve to a predetermined position, said housing having first and second outlet ports for connection to an output device, fifth flow connections including first and second openings in said sleeve valve respectively in communication with said first and second outlet ports, third and fourth portions of said slave valve in one position thereof being coextensive with said first and second openings, said first and second outlet ports upon movement of said slave valve in the direction from said one position being respectively in communication with said second portion and said one end of said slave valve, said sleeve valve upon movement in said one direction relative to said slave valve in said one position placing said first and second outlet ports respectively in communication with said second portion and said one end of said slave valve, and said sleeve valve upon movement in the opposite direction placing said first and second outlet ports respectively in communication with said first and second portions of said slave valve.

8. A hydraulic valve mechanism comprising first and second cylinders, a pilot valve slidable in said first cylinder, a sleeve valve slidable in said second cylinder, a slave valve slidable in said sleeve valve, a first passage in communication with a source of high-pressure fluid from a source, a second passage for return of fluid to the source, said first and second passages being connected to said first cylinder, fluid conduits connecting said first cylinder to said second cylinder, said pilot valve having spaced lands defining first and second fluid chambers respectively in communication with said first and second passages through said first cylinder, said sleeve valve having spaced lands defining fluid chambers in communication with respective conduits, said slave valve having spaced lands defining fluid chambers and having its lands and fluid chambers in communication with respective fluid chambers of said sleeve valve, said pilot valve having a balanced position, said pilot valve upon movement from said balanced position establishing fluid flow through at least one of said fluid conduits and fluid chambers of said sleeve valve between one of said first and second fluid chambers and one end of said slave valve to effect movement of said slave valve in a direction and through a distance corresponding to movement of said pilot valve, output passages connected to said second cylinder for directing fluid to an output device, first means to actuate said pilot valve in response to first mechanical forces, second means for actuating said sleeve valve in response to second mechanical forces, and said slave valve and sleeve valve by their combined movements controlling the direction and magnitude of fluid flow through said output passages to the output device.

References Cited in the file of this patent

UNITED STATES PATENTS

| | | |
|---|---|---|
| 2,615,302 | Camerota | Oct. 28, 1952 |
| 2,738,772 | Richter | Mar. 20, 1956 |
| 2,782,769 | Best | Feb. 26, 1957 |

FOREIGN PATENTS

| | | |
|---|---|---|
| 347,899 | Italy | Jan. 14, 1937 |